United States Patent [19]

Wagner et al.

[11] Patent Number: 5,238,298
[45] Date of Patent: Aug. 24, 1993

[54] TOW ACTIVATED BRAKE RELEASE METHOD AND APPARATUS

[75] Inventors: Edwin R. Wagner, Eagle Creek; Allen P. Forsyth, Portland, both of Oreg.

[73] Assignee: Atlas Copco Construction & Mining Technique A.B., Sweden

[21] Appl. No.: 881,400

[22] Filed: May 11, 1992

Related U.S. Application Data

[63] Continuation of Ser. No. 692,442, Apr. 24, 1991, Pat. No. 5,112,113.

[51] Int. Cl.$^5$ .............................................. B60T 13/22
[52] U.S. Cl. ...................................... 303/71; 188/170; 303/18
[58] Field of Search ................. 303/71, 7, 9.76, 48–49, 303/2, 68, 18, 69, 75, 86; 280/452, 421, 420, 446.1; 188/170, 3 R, 3 H, 112 R, 112 A, 151 A, 216, 167, 168, 169

[56] References Cited

U.S. PATENT DOCUMENTS

| | | | |
|---|---|---|---|
| 3,272,566 | 9/1966 | Clack | 303/71 X |
| 3,570,633 | 3/1971 | Garnett | 188/112 |
| 3,650,570 | 3/1972 | Meeks | |
| 3,943,829 | 3/1976 | Newstead et al. | 188/170 X |
| 4,014,579 | 3/1977 | Dubois | 303/71 X |
| 4,116,113 | 9/1978 | Leclerc | 303/71 X |
| 4,505,355 | 3/1985 | Scheurenberg et al. | 180/308 |
| 4,576,418 | 3/1986 | Holzinger et al. | 303/71 |
| 4,813,518 | 3/1989 | Akiyama et al. | 188/170 |
| 4,856,622 | 8/1989 | Sartain et al. | 188/170 |
| 4,893,879 | 3/1990 | Middelhoven et al. | 303/71 |
| 4,989,703 | 2/1991 | Forsyth et al. | 192/4 A |
| 5,112,113 | 5/1992 | Wagner et al. | 188/170 X |

Primary Examiner—Douglas C. Butler
Attorney, Agent, or Firm—Klarquist, Sparkman, Campbell, Leigh & Whinston

[57] ABSTRACT

A brake release apparatus for a vehicle equipped with a spring-applied hydraulically-released brake system. The apparatus includes a tow hook attached to the vehicle and operably connected to a hydraulic cylinder so that a towing force on the tow hook actuates the hydraulic cylinder. The hydraulic cylinder is connected to transmit a hydraulic pressure to the vehicle brakes, releasing the brakes to permit towing. A spring returns the tow hook to its original position when the towing force is removed, thereby permitting the spring-activated brakes to be reapplied.

76 Claims, 4 Drawing Sheets

TOW ACTIVATED BRAKE RELEASE METHOD AND APPARATUS

RELATED APPLICATION DATA

This is a continuation of application Ser. No. 07/692,442, filed Apr. 24, 1991, now U.S. Pat. No. 5,112,113.

TECHNICAL FIELD

This invention relates to a method and apparatus for releasing brakes on disabled vehicles and more particularly to a method and apparatus for releasing spring-activated hydraulically-released vehicle brakes to permit towing of such disabled vehicles.

BACKGROUND OF THE INVENTION

For safety reasons, many industrial vehicles use spring-applied hydraulically-released brake systems (spring-applied brakes) to provide automatic fail-safe braking on loss of vehicle power or hydraulic fluid pressure. Such a system for wheel brakes is disclosed in U.S. Pat. No. 4,893,879 to Middelhoven, et al. Other such brake systems operate on a vehicle's driveline as an emergency brake.

The disadvantage of current vehicles equipped with spring-applied brakes is that such brakes prevent a disabled vehicle from easily being towed. This is a particular problem with vehicles used in mining, especially underground mining where access to a disabled vehicle is limited and the distance to a maintenance area may be great. This is particularly critical where remote-controlled, unmanned vehicles are used under unreinforced mine ceilings. Because workers are not permitted in such areas, repair and retrieval of a disabled vehicle may be impossible.

Some current systems for releasing spring-applied brakes to permit towing use an alternate backup pump and associated valves and power source on the vehicle to provide brake pressure in the event of a system failure and to provide a reserve to compensate for leakage. This type of backup system is costly to provide on every vehicle.

Another current system for releasing spring-applied brakes on a disabled vehicle is disclosed in U.S. Pat. No. 4,576,418 to Holtzinger, which discloses a brake release mechanism adapted to connect with a portable pump to provide sufficient hydraulic pressure to release the vehicle brakes. This requires a worker to approach the vehicle to make a connection.

Such current brake release systems require special equipment to be brought to the disabled vehicle, and increase the time needed to remove a disabled vehicle to permit its repair and to permit mining operations to begin. They also provide no means for braking the towed vehicle while it is being towed, an important safety consideration, especially in view of the typically heavy weight of such equipment.

SUMMARY OF THE INVENTION

A primary object of the invention is to provide a means and method for releasing a vehicle brake in a disabled vehicle having a spring-applied hydraulically-released brake system without requiring an external brake pressurizing apparatus.

The invention may include a brake system pressurizing hydraulic cylinder operably connected to the vehicle towing connection.

The invention may further include a pivoting tow hook to actuate the hydraulic cylinder when the vehicle is towed.

Another important object is to provide such means and method that are operable to release the vehicle brake in response to towing of the vehicle.

Another object is to provide a method and means as aforesaid that are also responsive to a release of towing force on the towing connection of the towed vehicle to reapply the vehicle brake.

Another object is to provide a method and means that may be employed by a remote-controlled, unmanned towing vehicle without complex connections requiring a worker to approach the disabled vehicle.

The foregoing and additional features and advantages of the present invention will be more readily apparent from the following detailed description which proceeds with reference to the accompanying drawings.

DETAILED DESCRIPTION OF A PREFERRED EMBODIMENT

Figure 1:
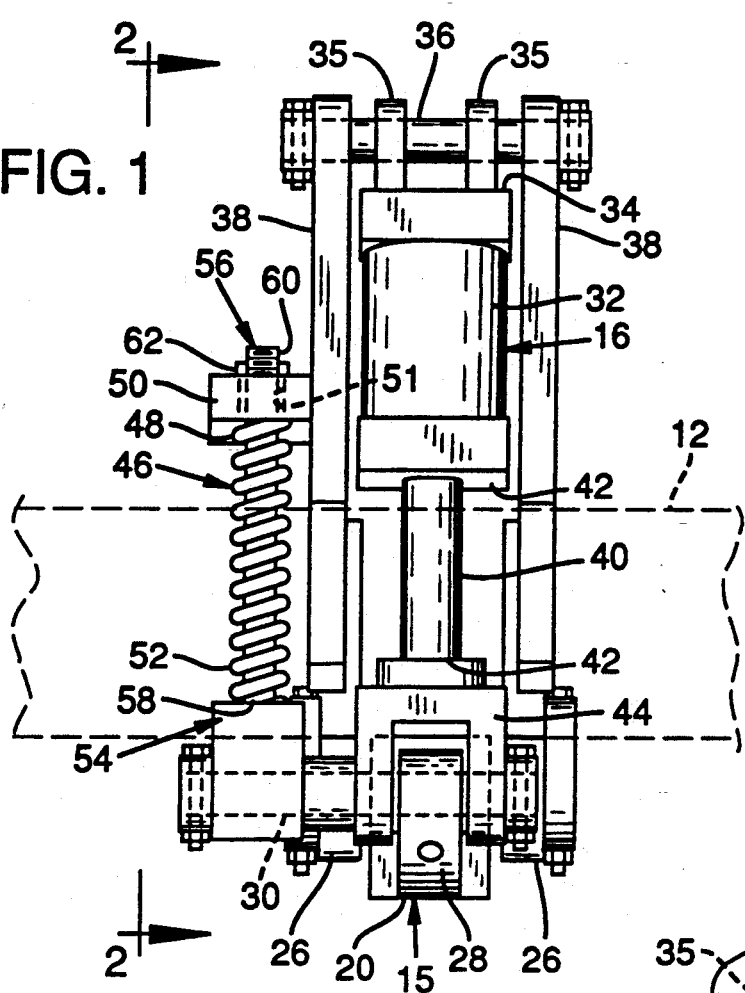
FIG. 1 is a rear elevational view of an apparatus according to the present invention shown mounted on the rear of a vehicle.
Figure 2:
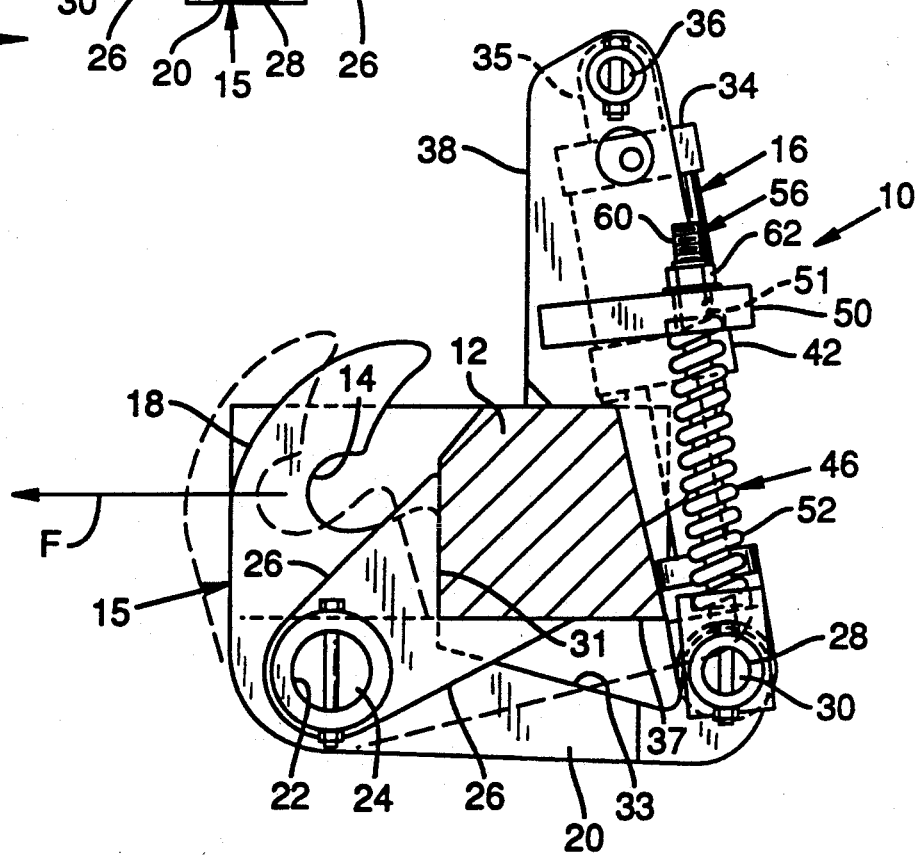
FIG. 2 is a sectional side view of the apparatus taken along line 2—2 of FIG. 1

FIGS. 1 and 2 show a tow hook brake release system 10 mounted to a vehicle chassis member 12. The system generally includes a tow hook 14 pivotally attached to the chassis to actuate a hydraulic cylinder 16 to generate a hydraulic fluid pressure in a brake-release circuit (FIG. 5) when the tow hook is pivoted by a towing (tension) force F applied by a towing vehicle (not shown). The hydraulic cylinder is operably connected to a spring-applied vehicle brake (shown in FIG. 5) in the brake-release circuit to release the vehicle brake when the tow hook is pivoted by the towing force F.

The tow hook 14 is part of a rigid generally L-shaped bell crank lever member 15 having a generally vertically projecting tow hook connection end 18 and a horizontally projecting actuator arm 20. Between tow hook connection end 18 and actuator arm 20, the lever member 15 is pivoted on an axle shaft 24 attached to chassis member 12 via tow hook mounting bracket arms 26. The tow hook 14 includes a pivot tube 21 that defines a pivot bore 22 at an intermediate location thereon. The pivot bore is sized to receive the axle shaft 24. The tow hook is mounted so that leftward pivoting motion of the connection end 18 as shown in FIG. 1 on pivot shaft 24 results in upward motion of the actuator arm 20. The free end of the actuator arm 20 is pivoted at a pivot connection 28 to a cylinder actuating axle or shaft 30. The lever member 15 is shown as fully actuated in dashed lines in FIG. 2.

When the lever member 15 is at rest, a towhook face 31 contacts the chassis member 12 to limit the member's motion. When the lever member is actuated by a towing force F, an arm upper face 33 rises until it contacts a lower surface 37 of the chassis member 12.

As shown in FIG. 1, the cylinder 16 includes a cylinder body 32 pivotally connected at an upper end 34 by ears 35 to a cylinder axle 36 retained by cylinder axle retaining arm members 38 that are fixed to the chassis 12 of the vehicle. A piston rod 40 is slidably received by the cylinder body 32 at a lower end 42 of the cylinder. The piston rod 40 has a lower end 42 fixed to a clevis member 44 rotatably connected to the cylinder actuating axle 30.

A tow hook biasing spring 46 is arranged in compression in a generally vertical orientation, with an upper spring end 48 of the spring 46 pressing upward against a stop block 50 that is rigidly affixed to the cylinder axle retaining member 38. The spring 46 has a lower spring end 52 arranged to press downward against a lower block 54 that is pivotally attached to the cylinder actuating axle 30. A spring retaining rod 56 is rigidly fixed at a lower end 58 to the lower block 54 and extends upward coaxially through the center of the spring and slidably through a stop block bore 51 (see FIG. 2) defined by the stop block 50. The retaining rod 56 terminates at an upper threaded portion 60 on which a nut 62 is retained. When the system is at rest, the spring 46 forces the lower block 54 downward so that the nut 62 rests against the upper surface of stop block 50, and the tow hook 14 is maintained in the resting position shown in FIG. 2.

When a towing force F is applied to the tow hook connection end 18 of the tow hook 14, the tow hook lever 15 pivots about the pivot axle 24, causing the actuator arm portion 20 of the tow hook lever 15 to move upward, raising the cylinder actuating axle 30. Consequently, the piston rod 40 slides into the cylinder body 32, causing its connected piston (not shown) to create a hydraulic fluid pressure therein. The hydraulic fluid pressure is transmitted through a hydraulic brake circuit (as will be shown below in FIGS. 5 & 6) to the vehicle wheel brakes to release the brakes. Actuation of the tow hook 14 also acts to compress the hook biasing spring 46. Thus, when the towing force is reduced or removed at the tow hook connection end 18 of tow hook lever 15, biasing spring 46 presses cylinder actuating axle 30 downward, thereby returning tow hook 14 to its original resting position shown in FIG. 1, and thereby also extending piston rod 40 to reduce the hydraulic fluid pressure in the cylinder 16 sufficiently to reapply the towed vehicle's spring-applied brakes.

Figure 3:
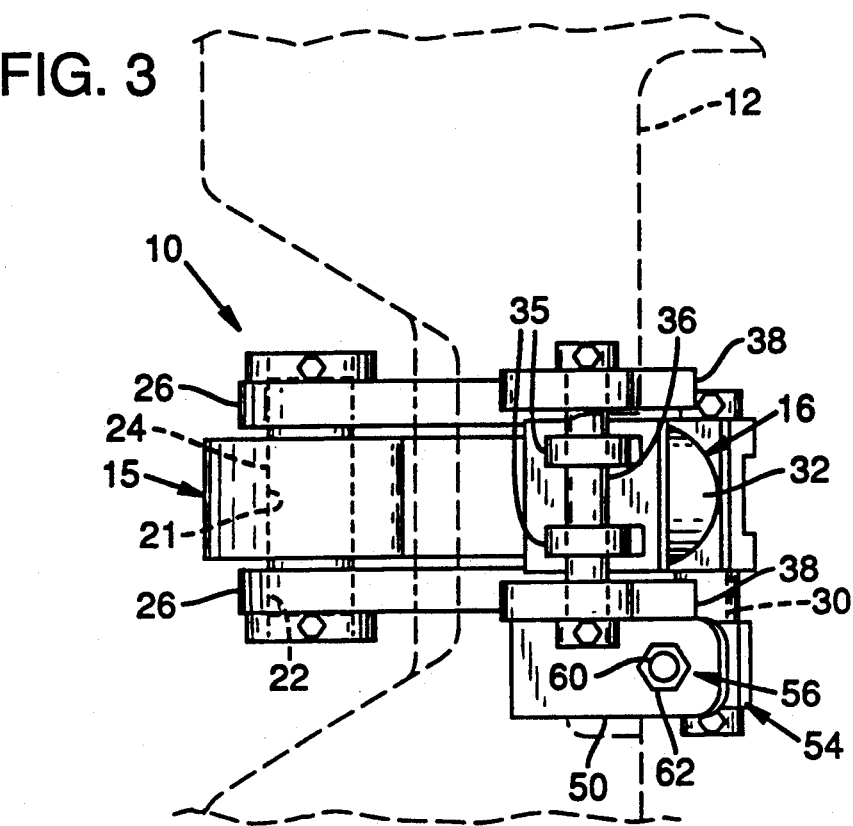
FIG. 3 is a top plan view of the apparatus of FIG. 1.

FIG. 3 shows a top view of the apparatus 10 installed on the chassis member 12 of a vehicle.

Figure 4:
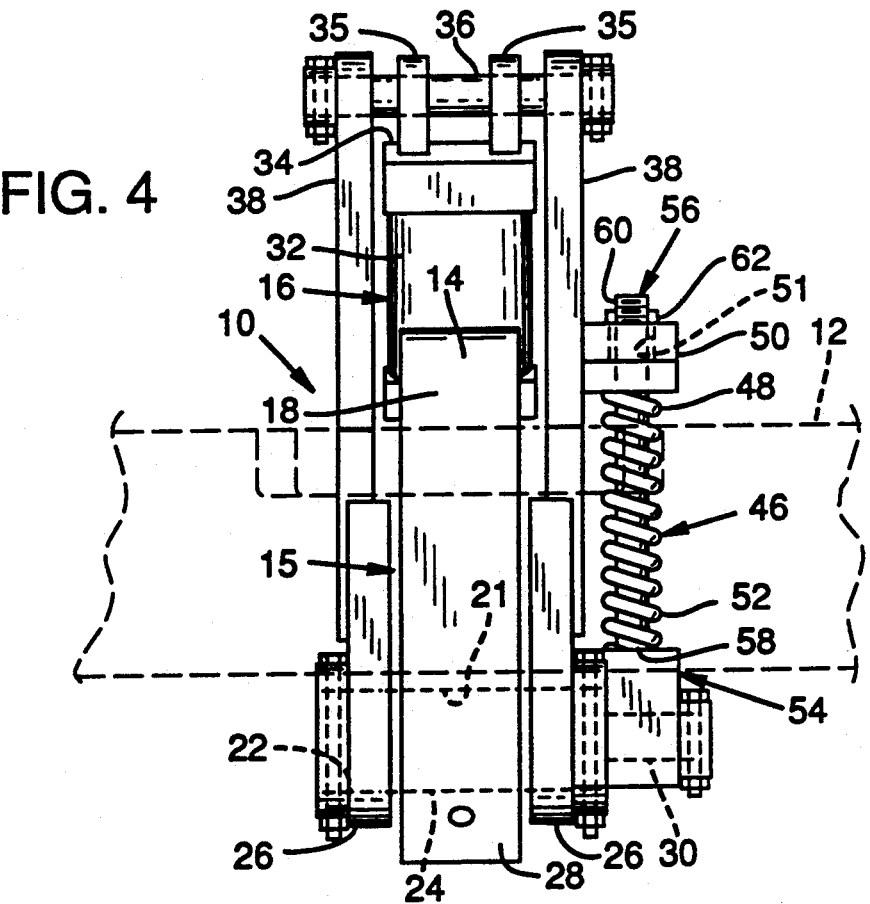
FIG. 4 is a front elevational view of the apparatus of FIG. 1.

FIG. 4 shows a front view of the tow hook brake release system 10.

Figure 5:
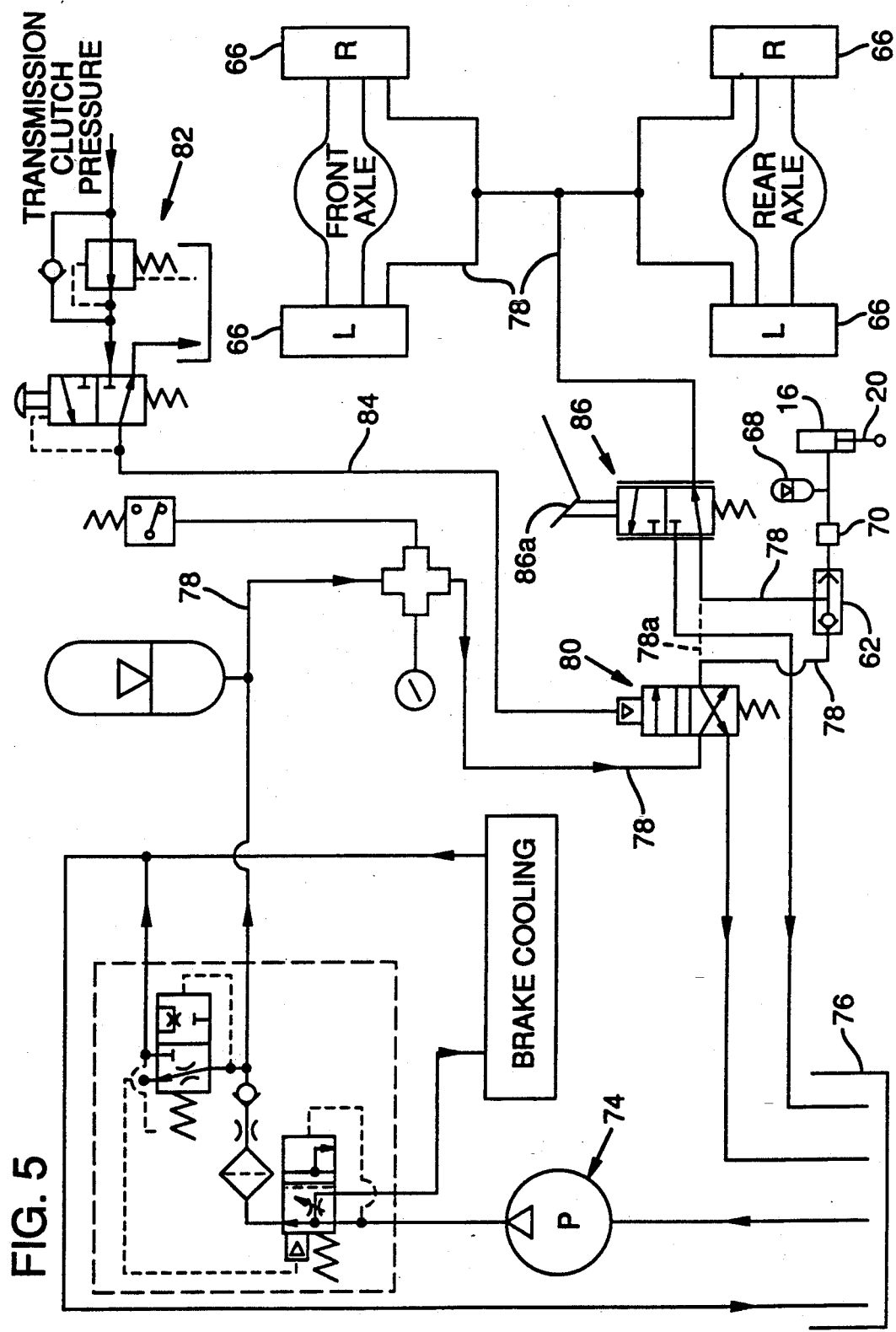
FIG. 5 is a schematic hydraulic circuit diagram showing the apparatus of FIG. 1 as applied to a spring-applied hydraulically-released wheel brake system.

FIG. 5 shows a schematic existing spring-applied brake system as disclosed in U.S. Pat. No. 4,893,879, the disclosure of which is incorporated herein by reference. Generally speaking, the illustrated system employs a pump 74 to draw fluid from a tank 76 and transmit it through brake line 78 to a plurality of wheel brakes 66. A control valve 80 is serially connected on the brake line 78 and is controlled by the output of a transmission clutch pressure circuit 82 through a pilot line 84 such that the control valve 80 is open only while the vehicle is functioning, with sufficient transmission clutch pressure. Thus, failure of the clutch pressure will close the valve and consequently cause the wheel brakes 66 to be activated automatically.

In the standard spring-applied brake system, the control valve communicates with a brake valve 86 through a brake line connection 78a (shown in dashed lines). The brake valve 86 is connected serially on the brake line 78 between the control valve 80 and wheel brakes 66 so that manual actuation of the brake valve foot pedal 86a opens the brake line circuit to permit the wheel brake 66 to be actuated. As shown in FIG. 5, the vehicle brake system is shown in a disabled state, that is, with no transmission clutch pressure to activate the control valve 80 and no operator foot pressure to activate the brake valve 86.

In the preferred embodiment of the invention, the hydraulic cylinder 16 is installed to be connected in communication through a shuttle valve 62 to the brake line 78 between the control valve 80 and the brake valve 86. The brake line connection 78a is eliminated on installation of the system according to the invention, and the brake line 78 exiting the control valve 80 is connected to the shuttle valve 62 so that it may communicate with the brake valve 86 during normal operation.

Actuation of the actuator arm 20 will compress fluid in the cylinder 16 to transmit a fluid pressure through shuttle valve 62 into brake line 78 and consequently to wheel brake 66 to release the brake.

Figure 6:
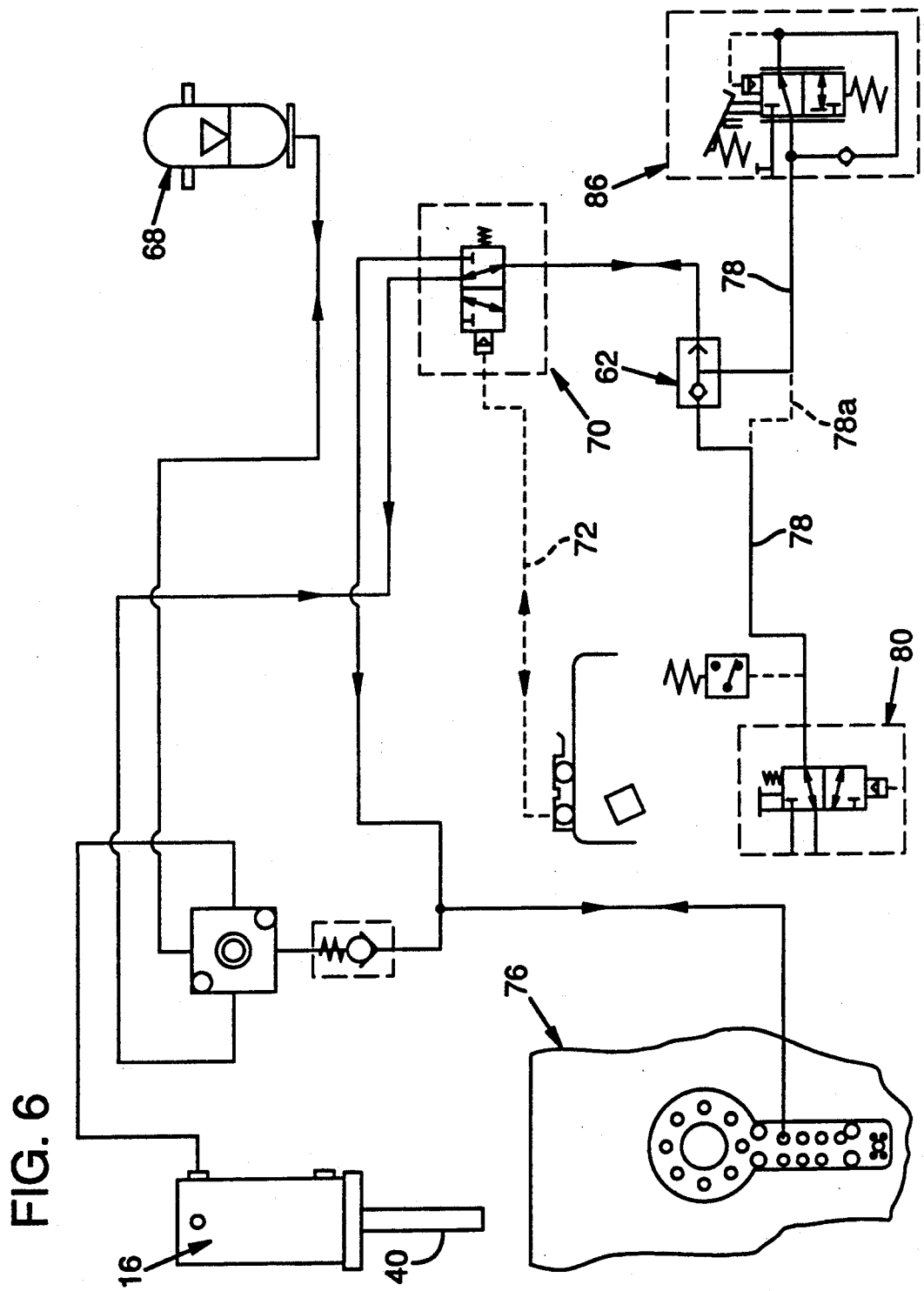
FIG. 6 is a detailed hydraulic circuit assembly diagram of the apparatus of FIG. 1.

FIG. 6 shows a schematic hydraulic circuit with the cylinder 16 in communication with an accumulator 68 and with the existing spring-applied brake system of FIG. 5. In the preferred embodiment, the cylinder 16 will provide 50 cubic inches of oil to the accumulator 68, which in turn will send 10 cubic inches to release the vehicle brakes, and store 40 cubic inches to allow for any leakage in the system. If the stored 40 cubic inches of oil leaks down substantially, the fluid pressure will be inadequate to maintain the brakes in a released state and the brakes will automatically be reapplied. If this application occurs, the brakes may be rereleased by releasing the tow hook 14 and then reapplying towing force F to the tow hook 14 to reactivate the hydraulic cylinder 16.

As further shown in FIG. 6, a transmission valve 70 is operably connected between the cylinder 16 and the shuttle valve 62 to negate the tow hook brake release effect when the vehicle is running. The transmission valve is activated while the transmission maintains a fluid pressure in a transmission line 72 to prevent a release of the wheel brakes 66 by actuation of the tow hook 14. Consequently, a running vehicle may not be towed in the same manner as a disabled vehicle.

While the apparatus is described as employing a hydraulic cylinder for providing hydraulic fluid pressure sufficient to release vehicle wheel brakes, it is contemplated that the hydraulic pressure generated may be used to release or activate an alternate source of stored hydraulic pressure. It is further contemplated that the brake release system may employ mechanical or electrical means to transmit a brake releasing force or power. Also, while a pivoting tow hook has proven effective in the preferred embodiment, it is contemplated that the brakes may be released by an engagement to the towing connection without a force thereon or movement thereby.

Thus, having illustrated and described the principles of our invention by what is presently a preferred embodiment, it should be apparent to those persons skilled in the art that the illustrated embodiment may be modified without departing from such principles. We claim as our invention not only the illustrated embodiment but all such modifications, variations, and equivalents thereof as come within the true spirit and scope of the following claims.

We claim:

1. A brake release apparatus for a vehicle equipped with a vehicle brake, the apparatus comprising:
   a force-receiving element for mounting on the vehicle in a position for receiving application of an external motive force to the vehicle;
   brake release means operably connected to the force-receiving element, said brake release means being operable for releasing the vehicle brake in response to application of a motive force to the force-receiving element, such that the vehicle may be moved without excessive brake resistance when the vehicle is disabled
   a brake applicator operably connected to the brake release means, the brake applicator being operable for applying the vehicle brake in response to the de-application of the motive force from the force receiving element, such that the vehicle is self-stopping in the absence of the motive force.

2. The apparatus of claim 1 wherein the brake release means is operable in response to application of a tensional motive force to the force-receiving element, such that the vehicle may be pulled.

3. The apparatus of claim 1 wherein the force-receiving element includes a movable portion movable in response to the motive force to operate said brake release means.

4. The apparatus of claim 3 wherein the brake applicator includes means biasing the movable portion of the force-receiving element against movement, such that the vehicle brake is applied in response to a release of the motive force on the force-receiving element.

5. The apparatus of claim 1 wherein said brake release means is disabled in response to release of the motive force to automatically apply the vehicle brake.

6. The apparatus of claim 1 wherein the brake applicator biases said brake release means to a disabled condition such that in the absence of the motive force, the vehicle brake is applied.

7. The apparatus of claim 1 wherein the brake release means comprises a fluid cylinder sensitive to the application of the motive force to the force-receiving element.

8. The apparatus of claim 7 wherein the vehicle brake is fluid-pressure-released by a fluid pressure acting through a fluid pressure circuit including pressurizing means for selectively generating a fluid operating pressure sufficient to release said vehicle brake,
   the fluid cylinder being operably connected in the fluid pressure circuit in a manner such that application of the motive force actuates the cylinder to generate a fluid operating pressure in the circuit sufficient to release the brake.

9. The apparatus of claim 8 wherein the fluid cylinder is a hydraulic cylinder, and the fluid pressure circuit is a hydraulic circuit.

10. The apparatus of claim 1 wherein the forcereceiving element includes a rigid tow hook comprising:
    a hook portion;
    an intermediate portion pivotally attached to the vehicle; and
    a brake release actuating portion.

11. The apparatus of claim 10 wherein the hook portion extends substantially vertically from the intermediate portion.

12. The apparatus of claim 10 wherein the hook portion is angularly offset from the actuating portion.

13. The apparatus of claim 10 wherein the brake release actuating portion is operably connected to the brake release means.

14. The apparatus of claim 1 wherein the vehicle brake includes a wheel brake.

15. The apparatus of claim 1 wherein the vehicle brake includes a driveline brake.

16. The apparatus of claim 1 wherein the brake release means and brake applicator are cooperable for providing a modulatable net braking force inversely proportional to the motive force.

17. The apparatus of claim 1 wherein the brake release means is operable for generating a brake-releasing fluid pressure and the brake applicator is operable in response to a reduction in motive force to diminish said fluid pressure.

18. The apparatus of claim 1 wherein the force receiving element is movable through a range of motion between a resting position and an activated position.

19. The apparatus of claim 18 wherein the brake release means is operable for generating a brake-releasing fluid pressure proportional to the displacement of the force receiving element from the resting position, and wherein the brake applicator is operable to bias the force-receiving element toward its resting position.

20. A braking system for a vehicle including:
    braking means actuatable for retarding and stopping motion of the vehicle and releasable for permitting unimpeded movement of the vehicle;
    emergency brake operating means operably connected to the braking means for automatically applying the braking means in an emergency to stop the vehicle;
    brake release means operably connected to the braking means for releasing the braking means; and
    the brake release means being operable in response to an external motive force applied to a predetermined portion of the vehicle for overriding the emergency brake operating means and releasing the braking means to enable movement of the vehicle to a service location,
    the brake release means further being operable in response to removal of at least a portion of the external motive force for permitting the emergency brake operating means to apply the braking means to retard motion of the vehicle.

21. The system of claim 20 wherein the brake release means includes force-receiving means attached to an external portion of the vehicle for receiving an external motive force.

22. The system of claim 20 wherein the brake release means includes a towing connection for transmitting force between a towing device and the vehicle.

23. The system of claim 20 wherein the emergency brake operating means includes energy storage means normally actuated to brake the vehicle in the absence of actuation of the brake release means.

24. The system of claim 23 wherein the energy storage means includes a mechanical spring.

25. The system of claim 20 wherein the braking means includes a wheel brake.

26. The system of claim 20 wherein the brake release means includes a hydraulic circuit for transmitting fluid pressure to the braking means.

27. The apparatus of claim 20 wherein the brake release means is operable for providing a modulatable net braking force inversely proportional to the motive force.

28. The apparatus of claim 20 wherein the brake release means is operable for generating a brake-releasing fluid pressure.

29. The apparatus of claim 20 wherein the predetermined portion of the vehicle is movable through a range of motion between a resting position and an activated position.

30. The apparatus of claim 29 wherein the secondary brake release operating means is operable for generating a selectable limited fluid pressure proportional to the amount by which the predetermined portion of the vehicle is displaced from the resting position.

31. A wheel braking system for a vehicle comprising:
a brake housing for associated with a vehicle wheel;
a rotatable wheel element extending into the brake housing;
friction mean movable into frictional interaction with the wheel element for retarding and stopping the rotation;
brake applying means including energy storage means within the brake housing for applying braking force to the friction means and moving the friction means to frictional interaction with the rotatable when element to retard and stop wheel rotation;
fluid-pressure-operated brake release means for applying a brake releasing force in opposition to the braking force applied by the braking means to release the friction means from frictional interaction with the rotatable wheel element;
primary brake release operating means for selectively operating the brake release means and operable to control the magnitude of the brake releasing force to provide a controlled release of the friction means;
a force receiving element mounted on the vehicle and movable through a range of motion between a resting position and an activated position; and
secondary brake release operating means for generating fluid pressure for selectively operating the brake release means to fully release the friction means in response to a single movement of the force receiving element from the resting position to the activated position.

32. The system of claim 31 wherein the brake applying means comprises a brake piston and the energy storage means comprises a mechanical spring.

33. The system of claim 32 wherein the brake release means comprises a fluid pressure chamber within the housing defined in part by the piston such that fluid pressure applied to the piston within the chamber urges the piston may from the means in opposition to the spring.

34. The system of claim 31 wherein the primary brake release operating means includes a first manually operable brake valve in a pressure fluid circuit for controlling the fluid pressure within the fluid pressure chamber and thereby the brake releasing force.

35. The system of claim 31, including a second manually operable valve operable in a first position to activate the first valve and operable in a second position to deactivate the first valve to prevent operation of the brake release means, wherein the second valve means includes a manually operated park valve member and a pilot pressure operated control valve member, the control valve member being operated by pilot pressure from a transmission clutch fluid pressure circuit.

36. The apparatus of claim 31 wherein the secondary brake release operating means is operable for reducing fluid pressure in response to movement of the force receiving element toward the resting position to move the friction means into frictional interaction with the wheel element.

37. The apparatus of claim 31 wherein the secondary brake release operating means is operable for selectively operating the brake release means and operable to control the magnitude of the brake releasing force to provide a controlled operation of the friction means.

38. The apparatus of claim 31 wherein the secondary brake release operating means is operable for generating a selectable limited fluid pressure proportional to the amount by which the force receiving element is displaced from the resting position.

39. The apparatus of claim 31 wherein the secondary brake release operating means includes a hydraulic cylinder operably connected to the force receiving element.

40. A brake release apparatus for a vehicle equipped with a vehicle brake which may be applied to stop the vehicle when the vehicle is disabled, the brake release apparatus comprising:
a brake release means mountable on the vehicle for operable connection to the vehicle brake;
a force receiver mountable on the vehicle in a position for receiving an external motive force for moving the vehicle; and
connector means for operably interconnecting the force receiver and the brake release means and enabling the brake release means to sense application of the motive force to the force receiver,
said brake release means being operable in response to application of the motive force to the receiver to release the vehicle brake and thereby to enable movement of the vehicle, said brake release means further being operable in response to deapplication of the motive force to re-apply the vehicle brake.

41. The apparatus of claim 40 wherein the brake release means includes a fluid cylinder having a piston, the connector means includes a piston rod connected to the piston, and the force receiver is operably connected to the piston rod.

42. The apparatus of claim 40 wherein the force receiver includes a tow coupling for connecting to a towing vehicle and for receiving a towing force.

43. The apparatus of claim 42 wherein the tow coupling includes a tow hook mountable on the vehicle for pivotable movement upon application of a towing force and operable upon movement to transmit an operating force to the piston rod to operate the piston.

44. A braking system for a vehicle including:
braking means actuatable to generate a variable braking force for retarding and stopping motion of the vehicle and releasable for permitting unimpeded movement of the vehicle;
energy storage means operably connected to the braking means for actuating the braking means;
brake release means operably connected to the braking means for selectively and modulatably releasing the braking means; and coupling means operably connected to the brake release means and actuatable by an external force for releasing the braking means to generate a modulated braking force inversely related to the magnitude of the external force, such that the vehicle may be moved without excessive brake resistance when the coupling means is actuated by the external force, whereby the vehicle brakes may be gradually released as the external force is gradually applied.

45. The system of claim 44 wherein the coupling means is attached to an external portion of the vehicle.

46. The system of claim 44 wherein the coupling means includes a towing connection for transmitting force between a towing device and the vehicle.

47. The system of claim 44 wherein the energy storage means is normally actuated to brake the vehicle in the absence of actuation of the brake release means.

48. The system of claim 47 wherein the energy storage means includes a mechanical spring.

49. The system of claim 44 wherein the braking means includes a wheel brake.

50. The system of claim 44 wherein the brake release means includes a hydraulic circuit for transmitting fluid pressure to the braking means.

51. The apparatus of claim 44 wherein the brake release means is operable to reapply the brakes in response to a reduction of the external force.

52. The apparatus of claim 44 wherein the coupling means includes pressure means for generating sufficient fluid pressure to release the braking means.

53. A method of moving an unmanned vehicle having vehicle brakes comprising the steps:
applying a force to the vehicle;
automatically releasing the wheel brakes in response to application of the force;
moving the vehicle;
removing the force from the vehicle; and
while removing the force, automatically applying the vehicle brakes.

54. The method of claim 53 wherein the force is a motive force and the step of moving the vehicle comprises applying only the single motive force.

55. The method of claim 53 wherein the step of releasing the wheel brakes comprises gradually releasing the brakes while gradually applying the force to the vehicle.

56. The method of claim 53 wherein the step of applying the brakes comprises applying a braking force inversely proportional to the force applied to the vehicle.

57. The method of claim 53 wherein the step of applying a force to the vehicle includes generating a fluid pressure for releasing the vehicle brakes.

58. The method of claim 53 wherein the step of automatically applying the brakes occurs while moving the vehicle.

59. A brake release apparatus for a vehicle equipped with a vehicle brake, the apparatus comprising:
a force-receiving element for mounting on the vehicle in a position for receiving application of an external motive force to the vehicle, the force-receiving element including a rigid tow hook comprising a hook portion, an intermediate portion pivotally attached to the vehicle, and a brake release actuating portion; and
brake release means operably connected to the forcereceiving element;
said brake release means being operable for releasing the vehicle brake in response to application of a motive force to the force-receiving element, such that the vehicle may be moved without excessive brake resistance when the vehicle is disabled.

60. The method of claim 59 wherein the hook portion extends substantially vertically from the intermediate portion.

61. The method of claim 59 wherein the hook portion is angularly offset from the actuating portion.

62. The method of claim 59 wherein the brake release actuating portion is operably connected to the brake release means.

63. A braking system for a vehicle including:
braking means actuatable for retarding and stopping motion of the vehicle and releasable for permitting unimpeded movement of the vehicle;
emergency brake operating means operably connected to the braking means for automatically applying the braking means in an emergency to stop the vehicle;
brake release means operably connected to the braking means for releasing the braking means, the brake release means including a towing connection for transmitting force between a towing device and the vehicle; and
the brake release means being operable in response to an external motive force applied to a predetermined portion of the vehicle for overriding the emergency brake operating means and releasing the braking means to enable movement of the vehicle to a service location.

64. A brake release apparatus for a vehicle equipped with a vehicle brake which may be applied to stop the vehicle when the vehicle is disabled, the brake release apparatus comprising:
a brake release means mountable on the vehicle for operable connection to the vehicle brake;
a force receiver mountable on the vehicle in a position for receiving an external motive force for moving the vehicle, the force receiver including a tow coupling for connecting to a towing vehicle and for receiving a towing force;
connector means for operably interconnecting the force receiver and the brake release means and enabling the brake release means to sense application of the motive force to the force receiver;
said brake release means being operable in response to application of the motive force to the receiver to release the vehicle brake and thereby to enable movement of the vehicle.

65. The apparatus of claim 64 wherein the tow coupling includes a tow hook mountable on the vehicle for pivotable movement upon application of a towing force and operable upon movement to transmit an operating force to the piston rod to operate the piston.

66. A braking system for a vehicle including:
braking means actuatable for retarding and stopping motion of the vehicle and releasable for permitting unimpeded movement of the vehicle;
energy storage means operably connected to the braking means for actuating the braking means;
brake release means operably connected to the braking means for selectively releasing the braking means; and
coupling means operably connected to the brake release means and actuatable for releasing the braking means, such that the vehicle may be moved without excessive brake resistance when the coupling means is actuated by an external force, the coupling means including a towing connection for transmitting a force between a towing device and the vehicle.

67. A brake release apparatus for a vehicle equipped with spring-applied selectively-applied-force-released vehicle brake, the apparatus comprising:

a towing connection for the vehicle; and brake release means operably connected to the towing connection, said brake release means being operable to release said vehicle brake in response to application of a connection force to the towing connection.

68. The apparatus of claim 67 wherein the towing connection is spring biased against movement, such that the vehicle brake is applied in response to a release of the connection force on the towing connection.

69. The apparatus of claim 67 wherein the brake release means comprises a fluid cylinder attached to the towing connection.

70. The apparatus of claim 69 wherein the vehicle brake is fluid pressure released by a fluid pressure acting through a fluid pressure circuit including means for selectively generating a fluid operating pressure sufficient to release said vehicle brake, said fluid cylinder being operably connected in said fluid pressure circuit in a manner such that application of the connection force to the towing connection actuates said cylinder to generate a fluid operating pressure in said circuit sufficient to release said brake.

71. The application of claim 70 wherein the fluid cylinder is a hydraulic cylinder, and the fluid pressure circuit is a hydraulic circuit.

72. The apparatus of claim 67 wherein the towing connection includes a rigid tow hook.

73. The apparatus of claim 67 wherein the vehicle brake includes a wheel brake.

74. The apparatus of claim 67 wherein the vehicle brake includes a driveline brake.

75. In a vehicle braking system including a sprig-applied, selectively-applied-force-released vehicle brake and a primary force generating means for selectively generating a primary brake releasing force to enable operation of the vehicle, said system further including:

a towing connection for the vehicle;

brake release means operably connected to the towing connection and to the vehicle brake; and said brake release means including means for generating a secondary brake releasing force in response to application of a connection force to the connection.

76. The apparatus of claim 75 wherein the system includes a pressure fluid circuit and the primary force generating means includes means for elevating the pressure of the fluid in the circuit to a brake releasing pressure and the secondary force generating means includes means for elevating pressure of the fluid in the circuit to the brake releasing pressure.

* * * * *